United States Patent
Chamarthi et al.

(10) Patent No.: US 8,051,645 B2
(45) Date of Patent: Nov. 8, 2011

(54) DETERMINATION OF DIESEL PARTICULATE FILTER LOAD UNDER BOTH TRANSIENT AND STEADY STATE DRIVE CYCLES

(75) Inventors: Gopal K. Chamarthi, Farmington Hills, MI (US); Edwin Allen Krenz, Canton, MI (US); David Chester Waskiewicz, Hamburg, MI (US); Peter Mitchell Lyon, Birmingham, MI (US); Bradley D. Gresens, Canton, MI (US); Norman Hiam Opolsky, West Bloomfield, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 828 days.

(21) Appl. No.: 12/062,224

(22) Filed: Apr. 3, 2008

(65) Prior Publication Data
US 2009/0151330 A1 Jun. 18, 2009

Related U.S. Application Data

(60) Provisional application No. 61/014,721, filed on Dec. 18, 2007.

(51) Int. Cl.
*F01N 3/00* (2006.01)
(52) U.S. Cl. ............... 60/295; 60/274; 60/276; 60/277; 60/297; 60/311
(58) Field of Classification Search .................. 60/274, 60/276, 277, 285, 295, 297, 311
See application file for complete search history.

(56) References Cited

U.S. PATENT DOCUMENTS

| | | | |
|---|---|---|---|
| 6,907,873 B2 * | 6/2005 | Hamahata | 123/676 |
| 6,941,750 B2 | 9/2005 | Boretto et al. | |
| 6,952,920 B2 * | 10/2005 | Shirakawa | 60/311 |
| 7,065,960 B2 | 6/2006 | Gioannini et al. | |
| 7,140,176 B2 | 11/2006 | Bartsch et al. | |
| 7,147,688 B2 * | 12/2006 | Kondou et al. | 95/1 |
| 7,357,822 B2 * | 4/2008 | Hamahata et al. | 55/283 |
| 7,395,661 B2 * | 7/2008 | Iida | 60/297 |
| 7,458,206 B2 * | 12/2008 | Yahata et al. | 60/297 |
| 2005/0188686 A1 | 9/2005 | Saito et al. | |
| 2005/0198944 A1 | 9/2005 | Saitoh et al. | |
| 2006/0032217 A1 * | 2/2006 | Kondou et al. | 60/297 |
| 2006/0260298 A1 | 11/2006 | Iida | |

FOREIGN PATENT DOCUMENTS
EP 1291514 3/2003
EP 1914537 4/2008

OTHER PUBLICATIONS

ISA Intellectual Property Office, Search Report of GB0822332.3, Apr. 29, 2009, United Kingdom.

* cited by examiner

*Primary Examiner* — Tu Nguyen
(74) *Attorney, Agent, or Firm* — Julia Voutyras; Alleman Hall McCoy Russell & Tuttle LLP

(57) ABSTRACT

Methods for updating the PF soot load of an engine are provided herein. In one example, a soot storage estimate is based on processing operations that occur at different timings. The method can improve soot estimation during some conditions.

15 Claims, 5 Drawing Sheets

DETERMINATION OF DIESEL PARTICULATE FILTER LOAD UNDER BOTH TRANSIENT AND STEADY STATE DRIVE CYCLES

The present application claims priority to U.S. Provisional Patent Application No. 61/014,721, filed Dec. 18, 2007, titled "Determination of Diesel Particulate Filter Load Under Both Transient and Steady State Drive Cycles," the entire contents of each of which are incorporated herein by reference.

BACKGROUND AND SUMMARY

A particulate filter (PF) may be used to reduce particulate matter emissions in engines, such as diesel engines. The PF may be periodically regenerated to remove accumulated particulate matter. The regeneration may be achieved by raising the temperature of the PF to a predetermined level to oxidize the accumulated particulate matter.

Timing of the PF regeneration may affect the operational life of the PF since regeneration of a PF overloaded with particulate matter may generate overly high temperatures and potentially degrade the PF ceramics due to overheating. On the other hand, too frequent regeneration may result in reduced fuel economy, as energy is used to raise the exhaust temperature. Further, too frequent regeneration may result dilution of engine lubricating oil, thereby causing increased warranty due to higher component wear.

Timing of the regeneration of PF particulate matter may be provided based on estimates of soot load, or based on differential pressure measurements across the filter, for example, along with monitoring of other parameters such as temperature.

The inventors herein have recognized various issues with such approaches. In particular, pressure-based measurements may be too inaccurate at low exhaust volume flows due to degraded accuracy of sensors at the limits of their operating range. In addition, pressure-based measurements may be too inaccurate during transient conditions due to high time constants of the sensors and unsteady fluid dynamics in the exhaust system.

To at least partially address the above mentioned issues, the inventors herein provide various systems and methods for updating the PF soot load of an engine. In one embodiment, the method may include performing regeneration in response to both pressure-based measurements as well as estimated soot loading independent of the pressure-based measurements, where during conditions in which the pressure-based measurements may be inaccurate, the soot load is estimated based on operating conditions and previous pressure-based measurements that occurred during previous conditions in which the pressure-based measurements are more accurate. In this way, more continuous monitoring of particulate filter loading is provided, while taking advantage of pressure-based measurements from the most recent accurate reading, for example, and operating conditions that have transpired since such reading, including transient conditions. Thus, more appropriately timed regeneration may be provided.

BRIEF DESCRIPTION OF THE DRAWINGS

FIG. 4 shows a prophetic example of operation.

DETAILED DESCRIPTION

Figure 1:
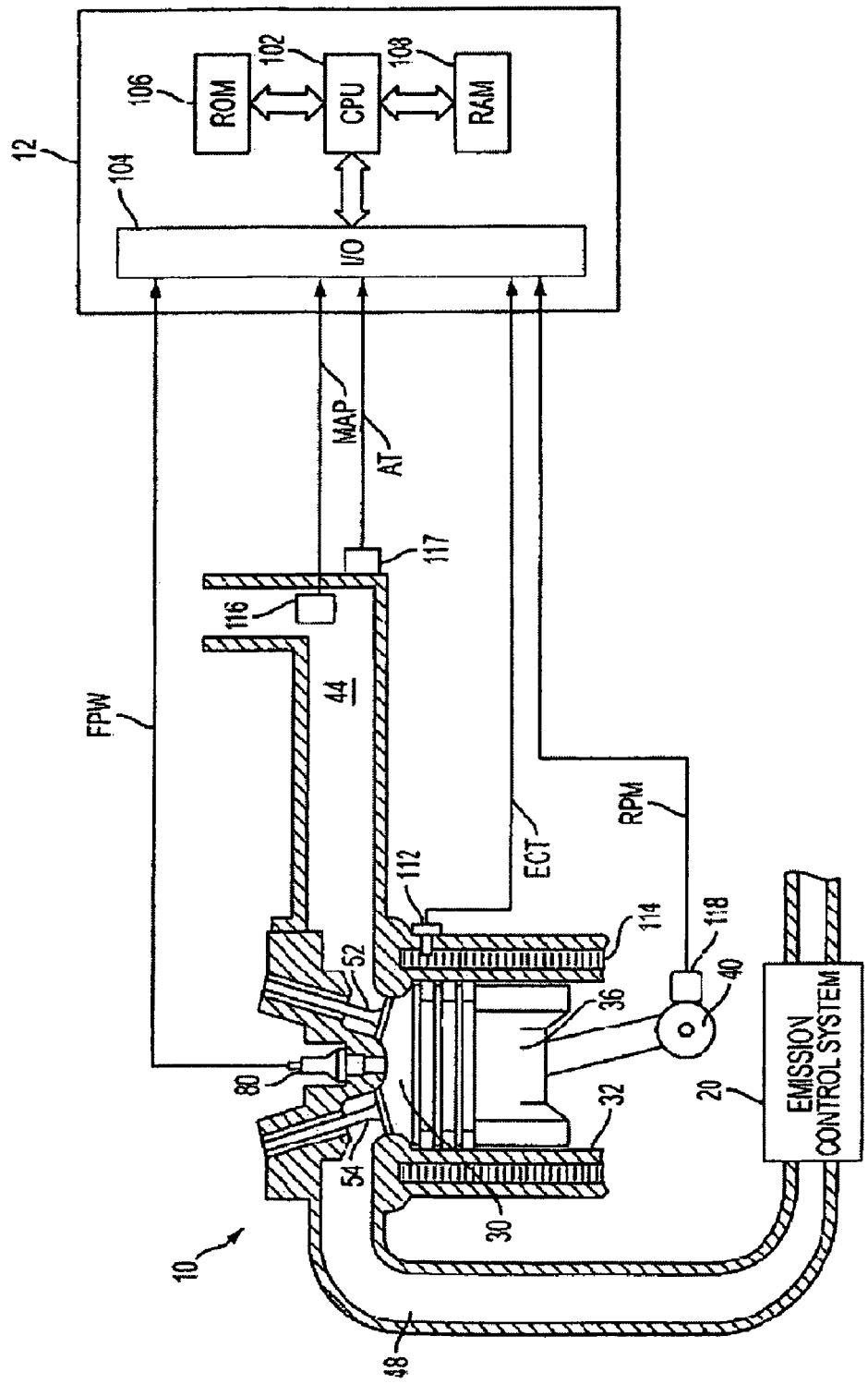
FIG. 1 is schematic diagram of an example engine including a soot load monitoring system for monitoring soot load of a particulate filter.

FIG. 1 is a schematic diagram of an example internal combustion engine 10 in which the disclosed system and method for monitoring soot load of a particulate filter may be implemented. The engine may be a diesel engine in one example.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Engine 10 is shown as a direct injection engine with injector 80 located to inject fuel directly into cylinder 30. Fuel is delivered to fuel injector 80 by a fuel system (not shown), including a fuel tank, fuel pump, and high pressure common rail system. Fuel injector 80 delivers fuel in proportion to the pulse width of signal FPW from controller 12. Both fuel quantity, controlled by signal FPW and injection timing may be adjustable. Engine 10 may utilize compression ignition combustion under some conditions, for example.

Controller 12 is shown in FIG. 1 as a microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 2:
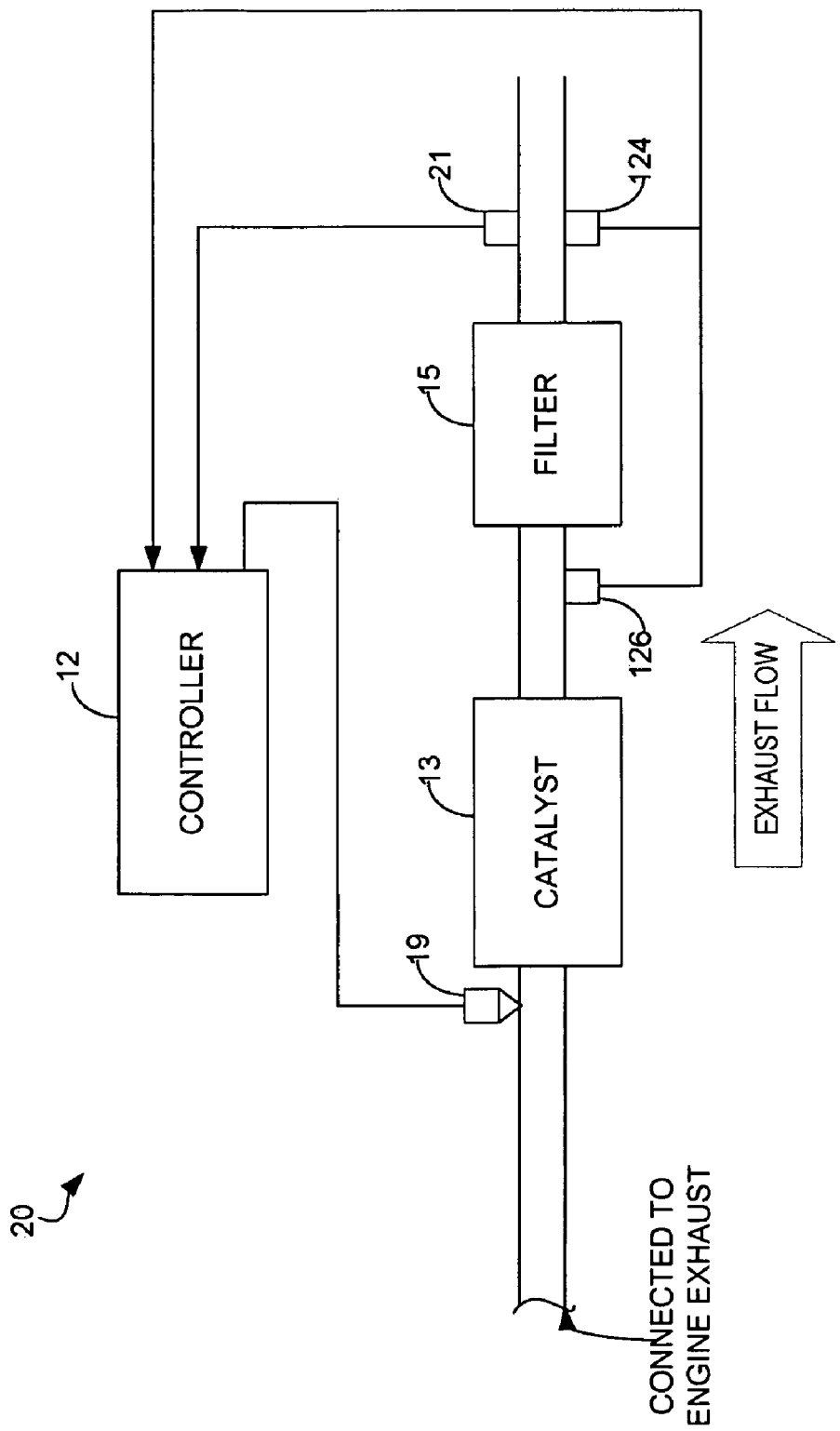
FIG. 2 is a schematic diagram of an example of the emission control system of the engine of FIG. 1.

An emission control system 20 is coupled to an exhaust manifold 48 and an example embodiment of the system is described with particular reference to FIG. 2.

As noted, in one example, engine 10 may be a diesel fueled engine that operates with stratified charge combustion in excess oxygen conditions. Alternatively, fuel timing adjustments, and multiple fuel injections, can be utilized to obtain homogeneous charge compression ignition combustion. While lean operation may be utilized, it is also possible to adjust engine conditions to obtain stoichiometric or rich air-fuel ratio operation.

In another alternative embodiment, a turbocharger can be coupled to engine 10 via the intake and exhaust manifolds. The turbocharger may include a compressor in the intake and a turbine in the exhaust coupled via a shaft. Further, the engine may include a throttle and exhaust gas recirculation.

Referring now to FIG. 2, the emission control system 20 optionally includes a catalyst system 13 upstream of the particulate filter 15. Various types of catalysts can be optionally used, such as, for example: a urea based Selective Catalytic Reduction (SCR) catalyst, an oxidation catalyst, and/or a NOx absorber, or these catalysts could be combined with the particulate filter. In the case of an SCR catalyst, in one example, it may include a base metal/zeolite formulation with optimum NOx conversion performance in the range of 200-500° C. Reductant, such as aqueous urea, can be stored on-board and injected in the exhaust system upstream of the SCR catalyst. Alternatively, any other structure known to those skilled in the art to deliver reductant, such as hydrocarbons (HC), to an exhaust gas aftertreatment device may be used, such as late injection in a direct injection type engine.

Alternatively, catalyst system 13 may include (separate or in addition to the SCR catalyst) an oxidation catalyst, which may include a precious metal catalyst, preferably one containing platinum, for rapid conversion of hydrocarbons (HC), carbon monoxide (CO) and nitric oxide (NO) in the engine exhaust gas. The oxidation catalyst may also be used to supply heat in the exhaust system (such as for particulate filter regeneration), wherein an exotherm is created when extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or another approach to increase the HC concentration in the exhaust gas. Alternatively, hydrocarbons may be injected directly into the exhaust gas stream entering the oxidation catalyst. Reductant delivery system 19, such as a HC delivery system, may be used to deliver HC from the fuel tank or from a storage vessel to the exhaust system to generate heat for heating the particulate filter 15 for regeneration purposes.

Particulate filter 15, in one example a diesel particulate filter (DPF), may be coupled downstream of the catalyst system and may be used to trap particulate matter (e.g., soot) generated during the drive cycle of the vehicle. The DPF can be manufactured from a variety of materials including cordierite, silicon carbide, and other high temperature oxide ceramics. Once soot accumulation has reached a predetermined level, regeneration of the filter can be initiated. Filter regeneration may be accomplished by heating the filter to a temperature that will burn soot particles at a faster rate than the deposition of new soot particles, for example, 400-600° C. In one example, the DPF can be a catalyzed particulate filter containing a washcoat of precious metal, such as Platinum, to lower soot combustion temperature and also to oxidize hydrocarbons and carbon monoxide to carbon dioxide and water.

Further note that a temperature sensor 21 is shown coupled to the DPF. The sensor, or additional temperature sensors, could also be located within the DPF, or upstream of the filter, or DPF temperature (or exhaust temperature) can be estimated based on operating conditions using an exhaust temperature model. In one particular example, multiple temperature sensors can be used, e.g. one upstream and one downstream of the DPF.

Also, a differential pressure signal ($\Delta p$) is shown being determined from pressure sensors 124 and 126. Note that a single differential pressure can also be used to measure the differential pressure across DPF 15. A single port gauge pressure sensor (SPGS) may also be used. In yet another alternative embodiment, the DPF can be located in an upstream location, with an optional catalyst (or catalysts) located downstream. Generally, the pressure drop ($\Delta p$) across the DPF may be affected by the volumetric flow (F) and the soot loading of the DPF, as well as other factors such as temperature, fuel type, etc., which can be included if desired. The pressure drop may include contraction and expansion losses, frictional losses of the flow along the walls, and pressure losses, for example, in determining soot loading.

As will be appreciated by one skilled in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12.

Referring now to FIG. 3, a routine is described for determining soot loading, and thus controlling particulate filter regeneration, such as based on a determined flow restriction that may be correlated to soot loading, as well as based on an alternative soot loading model. In one example, this approach updates the DPF soot load under varied operating conditions by adding soot load estimated by a model, to the last measured soot load value. The soot model may include engine feedgas soot determined primarily a function of engine speed and torque. Ambient and Engine operating conditions may also be included as affecting feedgas soot. The soot model may estimate soot every 100 ms, whereas a slower calibratable timer determines the frequency at which soot estimated by the model is accumulated and added to measured soot load value. This timer may be executed only if the engine is running and the PF, such as DPF, is not in a regeneration mode. This timer can be calibrated to execute as slow as every 6 minutes, for example, and thus an additional accumulator may be used to capture soot generated during transient conditions as noted above. This transient accumulator may also be reset at the same frequency as the timer stated above, but with a delay. Soot from the soot model may be accumulated independently and added to last measured soot load value. When a measured soot load value is available, the accumulated soot load from model is cleared (e.g., set to zero). FIG. 3, below described routine 300, provides still further details of an example approach.

It should be noted that various steps of route 300 may be executed at different rates. For example, steps 302 to 328, and steps 348 and 350 may be executed at a calibratable rate, such as approximately every 10 second. Steps 332 to 346 (soot model) may be executed every 100 ms. Step 330 may be executed at a calibratable rate, such as every 2 minutes.

Figure 3A:
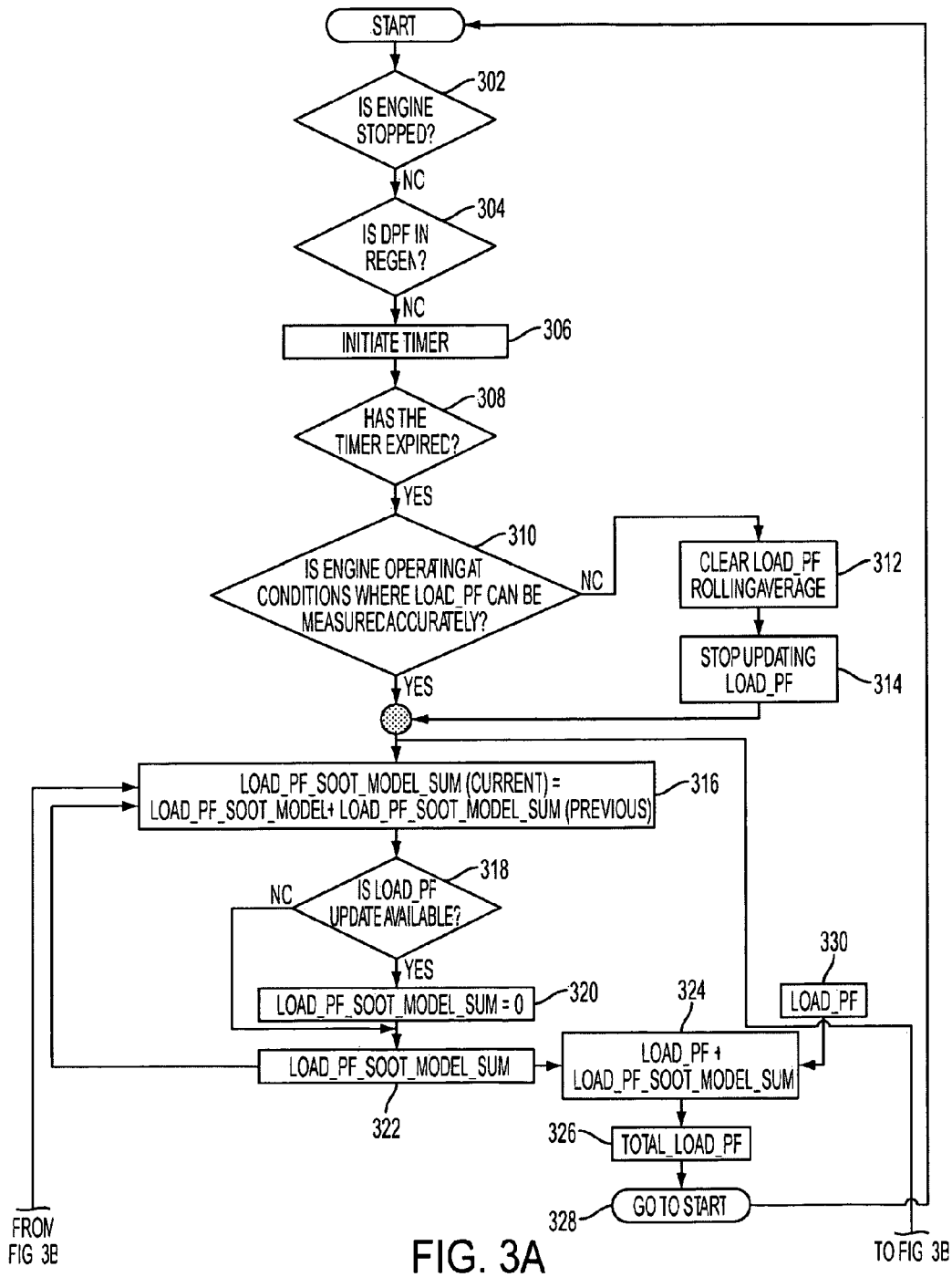
FIG. 3A-3B illustrate an example flow chart for a method for monitoring soot load of a PF which may be implemented in the soot load monitoring system of FIG. 1.
Figure 3B:
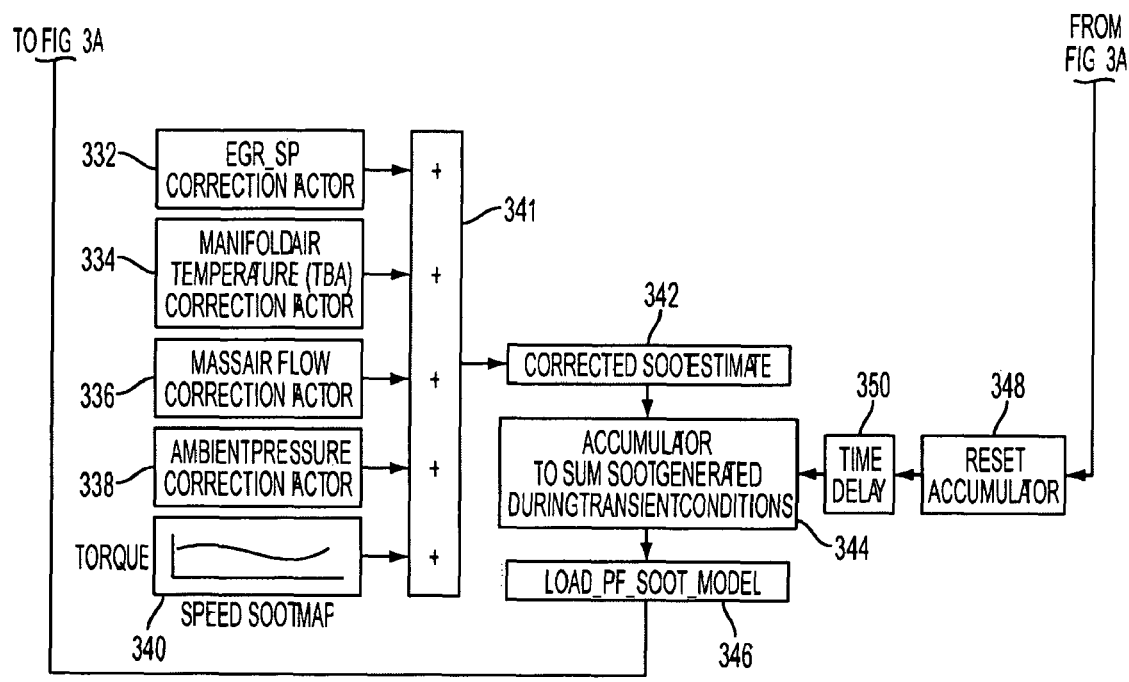

In the routine 300 as illustrated in FIGS. 3A & 3B, "LOAD_PF" represents measured soot load, or PF soot load estimate based on measurement; "LOAD_PF_SOOT_MODEL" represents incremental model determined soot load, or amount of soot accumulated from soot model during an incremental period, during transients; "LOAD_PF_SOOT_MODEL_SUM" represents cumulative incremental model determined soot load, or total amount of soot accumulated from soot model since last LOAD_PF update; and "TOTAL_LOAD_PF" represents total amount of soot accumulated from measurement and engine soot model.

Specifically, the routine 300 may include at 302, determining whether the engine is stopped. If the answer is no, the routine proceeds to 304.

At 304, determining whether the PF is in regeneration mode. If the answer is no, the routine proceeds to 306.

At 306, initiating a calibratable timer for measuring an interval at which the PF is to be monitored and updated. In some examples, the timer may be calibrated to execute as slow as every 6 minutes. The timer may be set to run only when the engine is running.

At 308, the routine may determine whether the timer has expired. When the timer expires, the routine may proceed to step 310.

The routine may include a subroutine A for determining whether the measured soot load will be updated with a newly measured soot load determined based on a differential pressure across the PF. The subroutine may include steps 310, 312, and 314. This routine may ensure that all samples averaged for measured soot load calculation are sampled during one drive cycle.

Under certain engine operating conditions, the soot load may not be accurately determined based on a measured differential pressure across the PF. For example, the PF soot load measurement may not be sufficiently accurate at low exhaust volume flows due to degraded accuracy of the pressure sensors at a low exhaust flow condition. Additionally, the PF soot load may be inaccurate during transients, due to the higher time constants of the sensors and/or the unsteady fluid dynamics in the exhaust system. Therefore, during these conditions, the estimate of soot loading is independent from the soot load based on the measured differential pressure across the PF. Instead a soot model is used to estimate the soot load based on speed and load, which is then corrected for engine/environmental operating conditions. The corrected soot model output is then added to the most recent measurement of soot load from the differential pressure that occurred under conditions outside those noted above.

At 310, the routine determines whether the engine is operating at conditions under which the soot load of the PF may be accurately measured, for example based on a measured differential pressure across the PF.

If the routine determines at 310 that the engine is operating at conditions under which the soot load of the PF may be accurately measured, the routine may proceed to 316, and the measured soot load of the PF at 330 is updated with a newly measured value. Otherwise if the soot load cannot be accurately measured, the routine may proceed to 312 and the un-updated measured soot load may be used, and the soot model may be used to continuously update the soot load.

At 312, the routine may clear the soot load rolling average, causing accumulator to reset at 348 with a time delay 350 following a soot model calculating a cumulative incremental model determined soot load. At 314, the routine may stop updating the soot load with a cumulative incremental model determined soot load.

The routine may also include a subroutine B for updating the soot load with a cumulative incremental model determined soot load. The subroutine may include 316, 318, 320, and 322, 324, 328, and 346.

At 316 the routine determines a current cumulative incremental model determined soot load, by cumulating individual incremental model determined soot loads determined using a soot load model (Subroutine C). The incremental model determined soot load is passed from the soot load model (Subroutine C) from 346.

At 318, the routine determines whether soot load has been updated with a newly measured soot load. If the answer is yes, the routine proceeds to 320. Otherwise the routine proceeds to 322.

At 320, the routine reset the cumulative incremental model determined soot load to zero.

At 322, the subroutine passes out a cumulative incremental model determined soot load. The cumulative incremental model determined soot load is zero if step 314 determines that the soot load has been updated with a newly measured soot load. Otherwise, the sum obtained at step 316 is passed as the cumulative incremental model determined soot load.

At 324, the routine may update a previous soot load with the incremental model determined soot load. The previous soot load, obtained from 330, may be a measured soot load from 326 if soot load rolling average is cleared at step 312 or if the required number of measured soot load samples has not been sampled.

At 326, the routine may pass out a total amount of soot load accumulated from soot load measurement and engine soot load model.

At 328, the routine may return to the start.

The routine may further include a subroutine C including a soot model for calculating the incremental model determined soot load. The subroutine may include 332 to 350.

The soot map 340 and various engine operating conditions are passed to a soot model 341. The various engine operating conditions may include for example manifold air temperature (TBA) correction factor 334, mass air flow correction factor 336, and the ambient pressure correction factor 338.

The soot model 341 calculates a corrected soot estimate 342, which is accumulated in an accumulator 344 to obtain sum soot generated during transient conditions. The routine outputs an incremental model determined soot load 346. The accumulator may be reset at 348 with a slight time delay 350 following the routine outputting an incremental model determined soot load at 346.

The soot map 340 may be stored in an engine controller. The various engine operating conditions may include for example manifold air temperature (TBA) correction factor 334, mass air flow correction factor 336, and the ambient pressure correction factor 338, which may be measured or calculated using various engine sensors.

The incremental model determined soot load 346 is passed to 316 to determine a current cumulative incremental model determined soot load.

Figure 4:
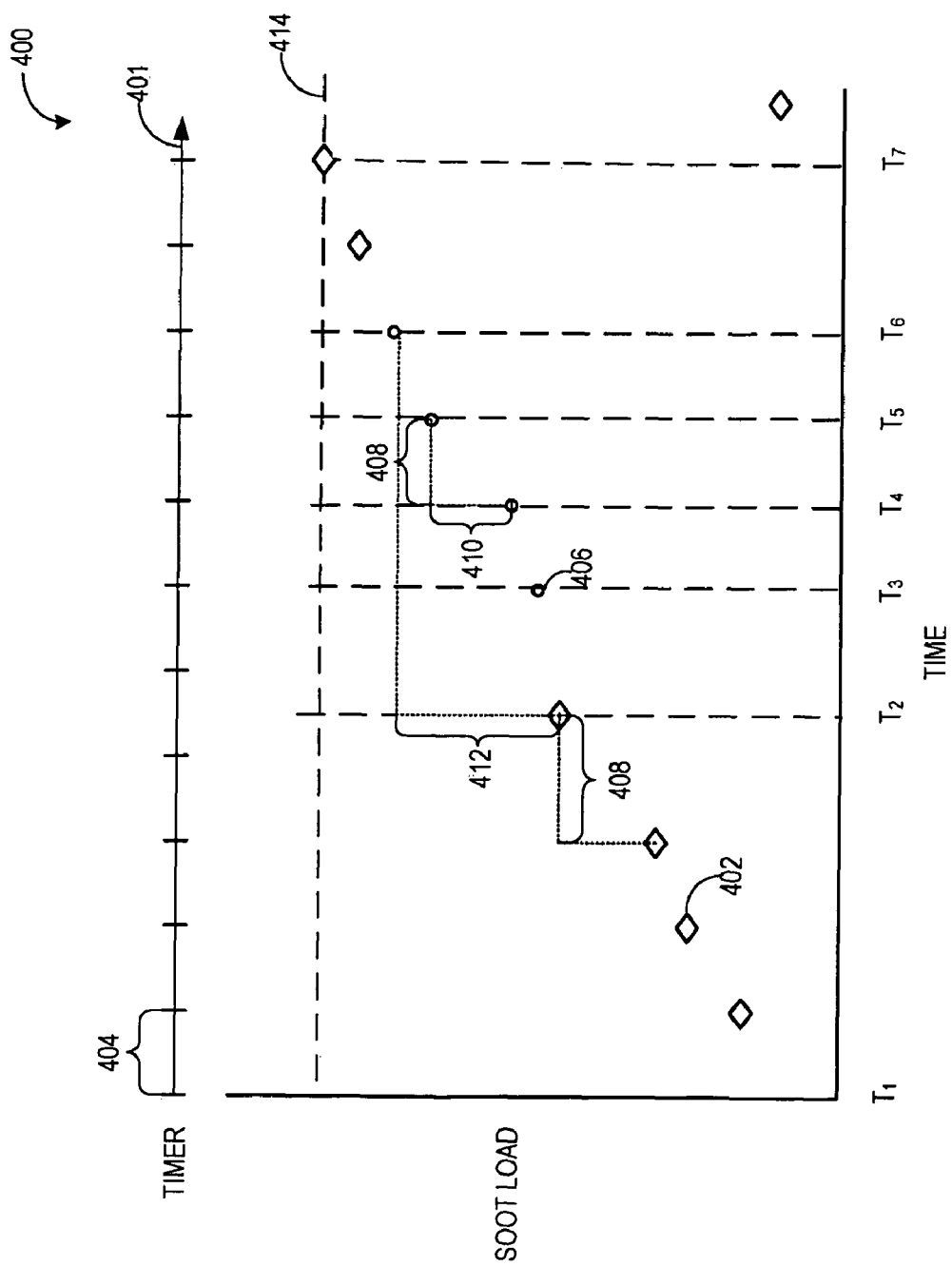
FIG. 4 is a time chart illustrating soot load values of a particulate filter over time, determined using an example embodiment of the herein disclosed system and method for monitoring soot load of a particulate filter. Specifically.

FIG. 4 shows a time chart 400 illustrating soot load values of a particulate filter (PF) of a soot load monitoring system of FIG. 1, determined at various instances during a drive cycle of an automotive vehicle using the herein disclosed system and method for monitoring soot load of a PF.

At $T_1$, the engine of the automotive vehicle is started. As a result, a calibratable timer 401 starts to run to measure one or more predetermined time intervals 404. The predetermined time intervals 404 measure the frequency at which the soot load of the PF is to be monitored and updated. The soot load of the PF may be monitored and/or updated each time the timer expires.

The method used to monitor or determine the soot load may depend on engine operating conditions. For example, when the engine is operating in high exhaust flow, during which the soot load may be accurately measured based on a pressure loss across the PF, the soot load of the PF may be determined based on a measured pressure loss across the PF. On the other hand, when the engine is operating in transient or in a low exhaust flow, during which the soot load may not be accurately determined based on a measured pressure loss across the PF, the soot load may be instead determined using a soot load model, the soot load model being based on engine speed, and/or engine torque, and/or other ambient and engine operating conditions, such as ambient temperature and EGR set point. Specifically, the most recent reading from the differential pressure may be used as a base-line, upon which the model incrementally adds additional estimated soot accumulated during conditions where the differential pressure is not used. In this way, the system may continue to monitor filter soot levels, even when the differential pressure-based reading is inaccurate.

In some examples, the timer 401 may be configured to run only under predetermined engine operating conditions, for example only when the engine is running. Additionally, the timer 401 may be executed or reset at a predetermined interval. In one example, the timer 401 may be executed or reset as slow as every 6 minutes. Furthermore, the timer 401 may include multiple timers, such as two independent timers, including a first timer for measuring a first time interval at which the soot load of the PF is to be measured based on a pressure loss across the PF, and a second timer for measuring a second time interval at which the soot load of the PF is to be calculated using a soot load model, such as the soot load model of FIG. 3. The first interval measured by the first timer may be different or the same as the second interval measured by the second timer. The multiple timers may or may not be synchronized, and may or may not start at the same time. Furthermore, the timer 401 may include separate timers for measuring a predetermined interval for monitoring the soot load of the PF and for updating the soot load model value.

During the time period starting at $T_1$ and ending $T_2$, the engine operating condition of the automotive vehicle is such that it may be possible to accurately determine the soot load of the particulate filter based on the differential pressure across the PF, and in some cases based also on the temperature inside the PF.

The data points represented by diamonds 402 show the measured soot load determined based on a pressure loss through the particulate filter, which may be determined from a differential pressure signal ($\Delta p$) determined via pressure sensors disposed upstream and downstream of the PF, such as pressure sensors 124 and 126 or via a single differential pressure sensor that measures the differential pressure across the PF, along with various other parameters such as temperature, etc. Thus, the measured soot load may also be determined based on other engine parameters, such as temperature inside the PF and volumetric exhaust flow, as well as other factors (which can be included if desired).

During the time period starting at $T_2$ and ending $T_6$, the engine operating condition of the automotive vehicle may be such that the soot load of the particulate filter may not be accurately determined based on the differential pressure across the PF, such as when the engine is operating in a low exhaust flow and/or when the engine is during a transient condition. For example, the engine is operating in a low exhaust flow condition from $T_3$ to $T_4$, and the engine is operating in a transient condition from $T_4$ to $T_5$. The data points represented by circles 406 are the model determined soot load, determined using a soot load model, at such an engine operating condition. For example, soot load 406 represents an estimated soot load based on the most recent pressure-based reading during acceptable conditions (e.g., the diamond at $T_2$), and further based on an estimated incremental soot generated during the period between $T_2$ and $T_3$, as determined by the soot model (independent from the pressure-based readings). In this way, even though the pressure-based reading is unavailable at time $T_3$, an accurate soot load may still be provided.

During the time period starting at $T_6$ and ending $T_7$, the engine operating condition of the automotive vehicle may be such that the soot load of the particulate filter may again be accurately determined based on the differential pressure across the PF, such as when the engine is operating in a high exhaust flow and when the engine is not during a transient condition. Thus, at $T_6$ the model may be cleared and the soot load again determined from the pressure-based readings.

The differential 410 represents an incremental model determined soot load determined using the soot model. The differential 412 represents the cumulative model determined soot load determined by cumulatively adding up the incremental model determined soot load for a time period starting at $T_2$ ending at $T_6$ At $T_7$, the soot load of the particulate filter has reached a predetermined threshold value 414 for regenerating the PF, and the PF is regenerated.

It will be appreciated that the configurations and routines disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. For example, once the pressure based measurement becomes available, it may be possible to adaptively update the model based on a comparison of the incremental soot load previously obtained while the pressure based measurement was unavailable.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure

We claim:

1. A method for regenerating a particulate filter in an exhaust of a vehicle, the method comprising:
    estimating soot via operating conditions independent of pressure indications of a sensor at a first time interval;
    providing an accumulated soot from the estimated soot at a second time interval, the second time interval slower than the first time interval; and
    performing a regeneration of the particulate filter responsive to flow restriction induced pressure indications of the sensor, where during inaccurate sensor reading conditions, the regeneration is further responsive to a previous reading of the sensor during accurate sensor reading conditions and the accumulated soot.

2. The method of claim 1, where an estimated soot loading is incrementally added to the previous reading until accurate sensor reading conditions occur.

3. The method of claim 1, where readings of the sensor are taken at a slower sampling rate than an estimated soot loading is determined.

4. The method of claim 1, where the sensor measures differential pressure across the particulate filter.

5. The method of claim 4, where the inaccurate sensor reading conditions include lower exhaust flow conditions.

6. The method of claim 5, where the accurate sensor reading conditions include higher exhaust flow conditions.

7. A method for regenerating a particulate filter in an exhaust of a vehicle, the method comprising:
    estimating soot via operating conditions independent of pressure indications of a sensor at a first time interval;

providing an accumulated soot from the estimated soot at a second time interval, the second time interval slower than the first time interval;

performing a regeneration of the particulate filter responsive to flow restriction induced pressure indications of the sensor, where during lower flow and transient conditions, the regeneration is further responsive to a previous reading of the sensor and the accumulated soot; and delaying adjustment of the accumulated soot after reading the sensor.

8. The method of claim 7, where the sensor measures differential pressure across the particulate filter.

9. The method of claim 7, where pressure indications of the sensor include a first pressure sensor reading upstream of the particulate filter and a second pressure sensor reading downstream of the particulate filter.

10. The method of claim 7 further comprising, during higher flow conditions, performing a regeneration of the particulate filter responsive to flow restriction induced pressure indications of the sensor independent from an estimated soot load.

11. The method of claim 10, further comprising regenerating the particulate filter by increasing exhaust heat of an engine via adjustment of engine operating conditions.

12. A method for regenerating a particulate filter in an exhaust of a vehicle, the method comprising:

determining a first soot loading responsive at least to differential pressure across the particulate filter and measured by at least a pressure sensor;

determining an incremental estimated soot loading of the particulate filter at a first time interval responsive to a plurality of operating conditions and independent from the pressure sensor;

during higher flow conditions, performing regeneration responsive to the first soot loading and independent of the incremental estimated soot loading;

during lower flow or transient conditions, performing regeneration responsive to a last first soot loading reading taken before entering the lower flow or transient conditions, and further based on accumulated soot at a second time interval, the second time interval slower than the first time interval, the accumulated soot based on the incremental estimated soot loading.

13. The method of claim 12, where during the lower flow or transient conditions, regeneration is responsive to the last first soot loading reading and a plurality of further incremental estimated soot loadings successively added to the last first soot loading reading, and where the first and second time intervals are based on independent timers.

14. The method of claim 13, further comprising clearing the incremental estimated soot loadings after a delay when entering the higher flow conditions.

15. The method of claim 14, further comprising adaptively updating the incremental estimated soot loadings based on a soot loading indicated by the sensor after exiting the lower flow conditions and entering the higher flow conditions.

* * * * *